United States Patent [19]
Potthoff et al.

[11] Patent Number: 5,641,436
[45] Date of Patent: Jun. 24, 1997

[54] LIQUID-VAPOR CONTACT COLUMN

[75] Inventors: Richard W. Potthoff; Alan C. Burton, both of Scotch Plains, N.J.

[73] Assignee: The BOC Group, Inc., New Providence, N.J.

[21] Appl. No.: 508,374

[22] Filed: Jul. 28, 1995

[51] Int. Cl.$^6$ ........................................ B01F 3/04
[52] U.S. Cl. ........................................ 261/114.1
[58] Field of Search ........................................ 261/114.1

[56] References Cited

U.S. PATENT DOCUMENTS

| | | |
|---|---|---|
| 2,646,266 | 7/1953 | Lockwood . |
| 3,231,251 | 1/1966 | Scheibel ........................ 261/114.1 |
| 3,573,172 | 3/1971 | Streuber . |
| 4,051,206 | 9/1977 | Bunas et al. . |
| 4,159,291 | 6/1979 | Bruckert et al. . |
| 4,265,736 | 5/1981 | Thayer . |
| 4,278,621 | 7/1981 | Sigmund et al. . |
| 4,356,132 | 10/1982 | Belyakov et al. . |
| 4,673,464 | 6/1987 | Zeitsch . |
| 5,242,628 | 9/1993 | Nye ........................ 261/114.1 |

FOREIGN PATENT DOCUMENTS

| | | | |
|---|---|---|---|
| 817579 | 8/1959 | United Kingdom | 261/114.1 |
| 1271083 | 4/1972 | United Kingdom | 261/114.1 |

*Primary Examiner*—Tim R. Miles
*Attorney, Agent, or Firm*—David M. Rosenblum; Salvatore P. Pace

[57] ABSTRACT

A liquid-vapor contact column comprising an outer tubular shell and a plurality trays supported within the tubular shell to intimately contact an ascending vapor phase with the descending liquid phase. An alignment of the active portions of the trays can produce a counterflow pattern in the vapor phase, opposite to the direction of flow of the liquid phase. This results in an increased hydraulic gradient taken from the outlet to the inlet of the tray. In order to inhibit the ascending vapor phase from flowing in the counterflow direction the active portions of the trays are staggered.

6 Claims, 1 Drawing Sheet

LIQUID-VAPOR CONTACT COLUMN

BACKGROUND OF THE INVENTION

The present invention relates to a liquid-vapor contact column having a plurality of trays supported within an outer tubular shell to contact liquid-vapor phases with one another. More particularly, the present invention relates such a column in which the trays are staggered to prevent a counter-flow pattern for the vapor phase as it ascends between trays of the column.

Liquid-vapor contact columns are commonly used in distillation applications. Other applications include heat exchange, absorption of a gas in liquid etc. In liquid-vapor contact columns, trays are supported within the column in order to contact gaseous and liquid phases, for example, phases of a mixture to be distilled. In the cryogenic distillation of air, as a vapor phase ascends within a column, it becomes evermore enriched in the lighter components of the air, such as nitrogen. As the liquid phase descends within the column, it becomes evermore concentrated in the heavier components of the air, for instance, oxygen. There are different types of tray designs that are useful in contacting liquid and vapor phases together. Commonly, in cryogenic air separation, sieve trays are used. Also used are bubble cap and expanded metal trays.

The liquid phase descends within the column, from tray to tray, through downcomers. Liquid flows from the downcomers onto an inlet portion of a tray and then across an active portion of the tray where liquid-vapor contact occurs. The liquid is then discharged from an outlet portion of the tray. The outlet portion discharges liquid to the next downcomer that opens up to the next lower tray. Vapor ascends through the column through the active portions of the trays which are provided with openings for the vapor to flow up through the tray and contact the liquid phase.

The flow pattern of the vapor phase, as viewed from tray to tray, interacts with flow pattern of the liquid phase. As the vapor ascends through the liquid, it does not ascend at right angles to the tray, but rather, is deflected at an angle to the tray, in the direction of the liquid flow. When trays are spaced so efficiently close together, instead of continuing the ascent to the next tray, at this angle, a counterflow pattern or path develops in which the vapor phase reverses direction. The effect of the curvature of the stream lines is a pressure gradient in the horizontal direction, with the highest pressure at the liquid outlet portion of the tray. This produces a higher hydraulic gradient of liquid which is necessary to overcome this pressure gradient and as result, froth heights are higher near the liquid inlet. Moreover, the backwards flowing vapor may carry entrained liquid backwards which increases the liquid load on the tray towards the inlet portion of the tray. This can lead to pre-mature flooding of the tray. The resultant higher hydraulic gradient may also lead to weeping near the liquid inlet which deteriorates the mass transfer efficiency because the weeping liquid by-passes two trays.

As will be discussed, the present invention provides a distillation column in which the trays are arranged to reduce the vapor cross-flow by straightening the counterflow path of the vapor phase between trays, thus allowing smaller tray spacings and more compact distillation column designs.

SUMMARY OF THE INVENTION

A liquid-vapor contact column comprising an outer tubular shell and a plurality of trays supported within the outer tubular shell to intimately contact an ascending vapor phase with a descending liquid phase. Each of the trays has an inlet portion for receiving the descending liquid phase, an outlet portion for discharging the descending liquid phase, and an active portion connecting the inlet and outlet portions. The active portion has openings through which the ascending vapor phase contacts the descending liquid phase flowing across the tray from the inlet to the outlet. The active portions of the trays are staggered to inhibit the ascending vapor phase from flowing in a counter flow direction with respect to said liquid phase flowing across said trays.

The flow of liquid deflects the ascending vapor phase in a direction of the liquid flow. However, the vapor phase is then constrained to return backwards or with respect to the liquid phase flow to the active portion of the tray above. This counterflow path produces a higher hydraulic gradient, liquid entrainment in the vapor with pre-mature flooding. By staggering the trays, the vapor phase tends to flow in its initial deflected flow path through the liquid to prevent or inhibit flow of the ascending vapor through a counterflow path.

BRIEF DESCRIPTION OF THE DRAWINGS

While the specification concludes with claims distinctly pointing out the subject matter that Applicants regard as their invention, it is believed that the invention will be better understood when taken connection with the accompanying drawings in which:

DETAILED DESCRIPTION OF THE DRAWINGS

Figure 1:
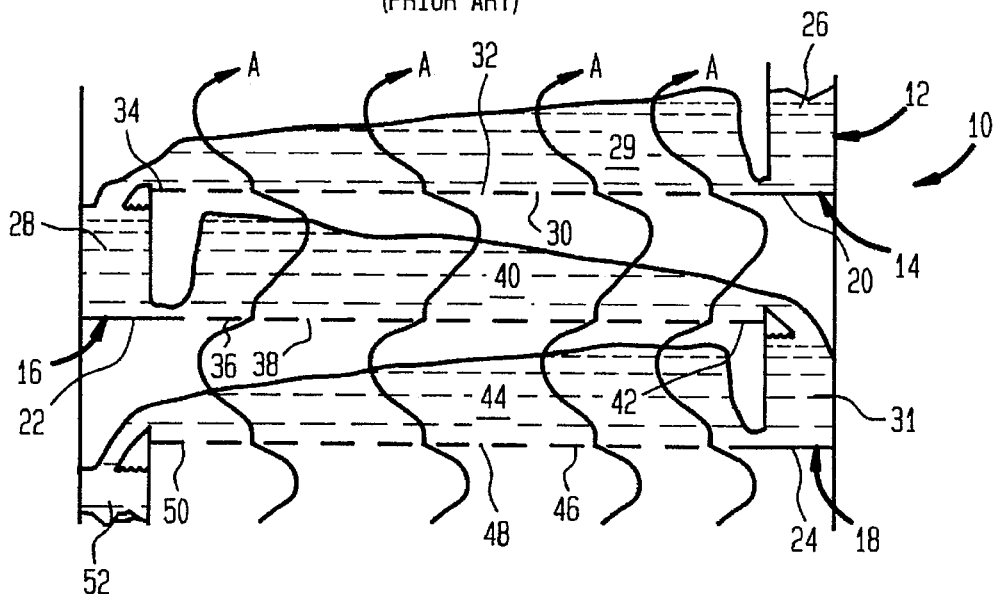
FIG. 1 is a schematic, cross-sectional view of a liquid-vapor contact column of the prior art.

With reference to FIG. 1 a liquid-vapor contact column 10 of the prior art is illustrated. Liquid-vapor contact column 10 is provided with an outer tubular shell 12 (preferably of cylindrical configuration) and trays 14, 16 and 18 supported within tubular shell 12. As can be appreciated, trays 14, 16, and 18 are shown for exemplary purposes and form part of a plurality of trays within liquid-vapor contact column 10. Trays 14, 16 and 18 are respectively provided with inlet portions 20, 22 and 24. Liquid descends through downcomers 26, 28 and 30 and flows onto inlet portions 20–24 of trays 14, 16 and 18 so that liquid flows from fight to left on tray 14, left to fight on tray 16, and then right to left on tray 18.

Liquid 29 enters inlet portion 20 of tray 14 through downcomer 26. It then flows across an active portion 30 of tray 14. Active portion 30 has openings or perforations 32 to allow the ascending vapor phase to mix with liquid 29 on active portion of tray 14. Liquid 29 flows from active portion 30 to an outlet portion 34 of tray 30 and flows into downcomer 28 of tray 16. Liquid from downcomer 28 flows onto inlet portion 22 of tray 16 and then over active portion 36, provided with perforations 38 to enable the ascending vapor phase to mix with liquid, designated by reference numeral 40. Liquid 40 flows across active portion 36 to outlet portion 42 of tray 16. Liquid 40 overflows outlet portion 42 into downcomer 31 and then enters tray 18 on inlet portion 24. The liquid on tray 18, designated by reference numeral 44, flows across an active portion 46 thereof. Active portion 46 is provided with perforations 48 to enable the ascending vapor phase to contact liquid 44. Liquid 44 after having flowed across active portion 46 is discharged from an outlet portion 50 of tray 18 to downcomer 52.

As streamlines of the ascending vapor phase, designated by the letter A, pass through liquid 44, they can be seen to deflect from right to left, in the direction of flow of the liquid phase. If the trays, are set at a sufficiently close distance to one another, which is desired to keep the column small, in order for the vapor to reach openings 38 of active portion of 36, the vapor has to reverse its direction and flow in a counterflow direction, opposite to the flow of liquid 44. This causes a pressure gradient in the horizontal direction with the highest pressure at outlet portion 50 of tray 18. The higher hydraulic gradient of liquid is necessary to overcome this pressure gradient which results in a higher froth height. As the vapor phase flows in a counterflow direction, between trays, there can exist liquid entrainment, carrying the liquid backward to increase the liquid flow in the tray. This can lead to premature flooding. The high hydraulic gradient may also lead to weeping of the tray near liquid inlet 24.

Figure 2:
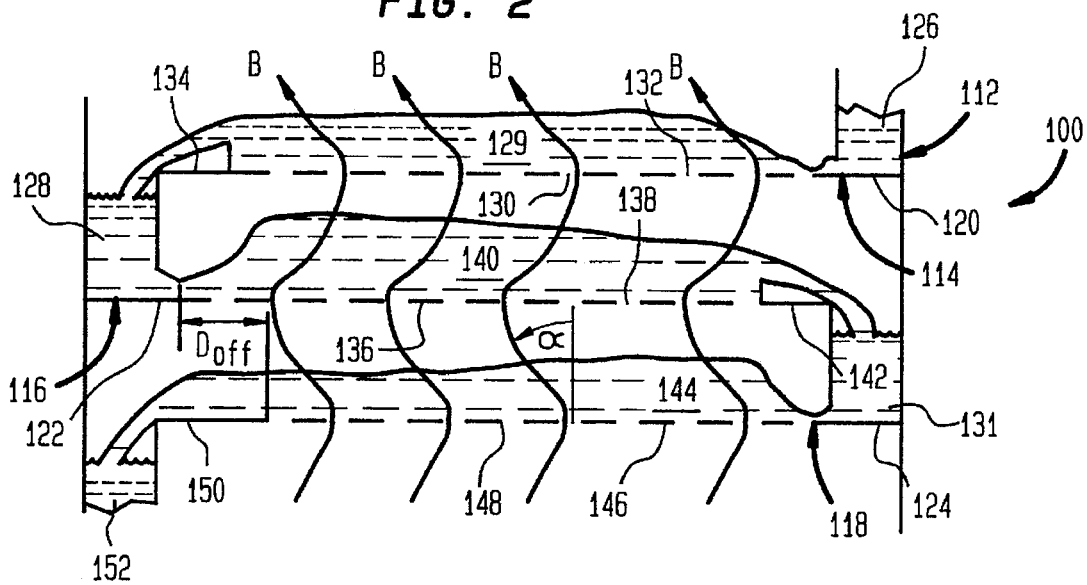
FIG. 2 is an embodiment of a liquid-vapor contact column in accordance with the present invention.

With reference to FIG. 2, a liquid-vapor contact device 100 is illustrated having an outer tubular shell 112 and a plurality of trays 114, 116 and 118 supported within tubular shell 112. Downcomers 126, 128, and 130 are provided for the liquid phase to flow to entrance portions 120, 122 and 124 of the respective trays 114, 116 and 118. As to tray 114, liquid 129 flows across an active portion 130 having openings 132 and is discharged from tray 114 to downcomer 128 from outlet portion 134 thereof. Tray 16 is provided with active portion 136 having perforations 138 the vapor phase to mix with liquid 140 of the liquid phase flowing across tray 116. Liquid 140 is discharged from tray 116 from outlet portion 142 into downcomer 131. Liquid 144 on tray 118 flows across active portion 146. Perforations 148 are defined in active portion 146 to allow the vapor phase to ascend through tray 118 and mix with liquid 144 of the liquid phase flowing across tray 118. Liquid 144 is discharged from an outlet portion 150 of tray 118 into a downcomer 152 onto the next succeeding underlying tray.

Streamlines B of the ascending vapor phase again deflect in the direction of flow of the liquid phase but do not have to reverse direction in order to reach active portions of successively higher trays because trays 114, 116, 118, and therefore their active portions, are staggered at an offset distance $D_{off}$. Thus, the staggering of the active portions inhibits vapor flow in a counterflow direction. As illustrated, streamlines B form an angle alpha with, for instance, tray 118. Applying simple geometry it can be seen that $D_{off}$ should be set equal to about a product of the tray spacing and $TAN(\alpha)$. Another way of expressing $D_{off}$ is by an equation. The calculated value for $D_{off}$ is an indicator for the strength of the cross flow effect. Often it is not necessary to compensate for this effect completely, e.g., using only half of the calculated offset would reduce the horizontal pressure gradient by 50% and prevent a reversed vapor-flow and backward entrainment of liquid.

$$\tan\alpha = \frac{L}{V} \cdot \frac{\rho_V}{\rho_L} \cdot \frac{l_{tr}}{h_{fr}\epsilon} \cdot c$$

$$D_{off} = (h_{trsp} - h_{fr} \cdot \epsilon) \cdot \tan$$

In this equation $h_{trsp}$=tray spacing L/V=liquid to vapor ratio (mass ratio); $\rho_v$=vapor density; $\rho_L$=liquid density; $l_{tr}$=active tray length; c=froth velocity profile shape factor c=1 for plug flow, c=2 for a linear velocity profile (constant acceleration of vapor in the horizontal direction), $\epsilon$=froth density (volumetric liquid fraction); and $h_{fr}$=froth height.

Figure 3:
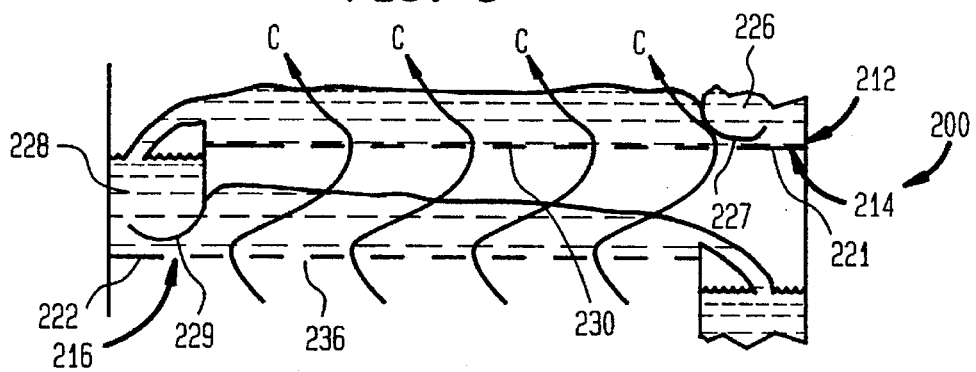
FIG. 3 is an alternative embodiment of a liquid-vapor contact column in accordance with the present invention.

If liquid vapor contact column 100 is compared with liquid vapor contact column 10 it can be seen that column shell 112 is fabricated with a larger diameter than column shell 12 due to the staggering of the trays contained within column shell 112. With reference to FIG. 3, a liquid-vapor contact column 200 is shown which is provided with a column shell 212 that has a diameter equal or at least close to that of a conventional liquid-vapor contact column such as that illustrated by liquid-vapor contact column 10. As in the previous embodiment, trays 214 and 216 are staggered and as illustrated, streamlines C of the ascending vapor phase do not flow in the counterflow direction due to such staggering.

The diameter of column shell 212 is reduced (as compared with column shell 112) by utilizing the void space below the outlet section of each tray for the downcomers 226 and 228. Downcomers 226 and 228, which supply liquid to trays 214 and 216, partially cover active portions 230 and 236 thereof. In order to prevent liquid from passing through active portions 230 and 236, downcomers 226 and 228 are provided with depending, curved diffuser sections 227 and 229 which inwardly curve into an underlying position beneath downcomers 226 and 228 and an overlying position with respect to the effected portions of active portions 230 and 236 and inlet portions 221 and 222 of trays 214 and 216. This arrangement increases the velocity of liquid introduced onto the trays and thus drops the pressure of such liquid over the effected portions of active portions 230 and 236 to prevent liquid from weeping into active portions 230 and 236. The diffuser-like profile of diffuser sections 227 and 229 act to recover the pressure of the liquid so that the liquid flows across the remainder of active portions 230 and 236.

While the invention has been described with reference to a preferred embodiment, it will be understood by those skilled in the art that numerous additions, changes and omissions may be made without departing from the spirit and scope of the present invention.

We claim:

1. A liquid-vapor contact column comprising:
    an outer tubular shell; and
    a plurality of trays supported within said tubular shell to intimately contact an ascending vapor phase with a descending liquid phase;
    each of said trays having an inlet portion for receiving said descending liquid phase, an outlet portion for discharging said descending liquid phase, and an active portion connecting said inlet and outlet portions and having openings through which said ascending vapor phase contacts said descending liquid phase flowing across said tray from the inlet to said outlet portions;
    said active portions of said trays being staggered at an offset distance to inhibit said ascending vapor phase from flowing in a counterflow direction with respect to said liquid phase flowing across said trays, the offset distance being equal to about a product of a distance said trays are spaced apart from one another and a tangent of an angle formed by said ascending vapor phase as it ascends from each of said trays.

2. The liquid-vapor contact column of claim 1, wherein each of said trays comprises a sieve tray.

3. The liquid-vapor contact column of claim 1, wherein said trays are offset from one another to in turn stagger said active portions.

4. The liquid-vapor contact column of claim 3, wherein each of said trays comprises a sieve tray.

5. The liquid-vapor contact column of claim 1, wherein:
    said liquid-vapor column has a plurality of downcomers for said descending liquid phase to descend;
    said downcomers have depending, curved diffuser sections overlying part of said active portions of said trays adjacent to said inlet portions to drop pressure of said liquid phase over said part of said active portions and thereby prevent said liquid phase from weeping therethrough.

6. The liquid-vapor contact column of claim 5, wherein each of said trays comprises a sieve tray.

* * * * *